United States Patent
Kartalopoulos

[11] Patent Number: 5,590,323
[45] Date of Patent: Dec. 31, 1996

[54] OPTIMAL PARALLEL PROCESSOR ARCHITECTURE FOR REAL TIME MULTITASKING

[75] Inventor: Stamatios V. Kartalopoulos, Clinton Township, Hunterdon County, N.J.

[73] Assignee: Lucent Technologies Inc., Murray Hill, N.J.

[21] Appl. No.: 242,526

[22] Filed: May 13, 1994

[51] Int. Cl.[6] .................................................. G06F 15/16
[52] U.S. Cl. ................................................ 395/676; 395/800
[58] Field of Search .................................. 395/650, 700, 395/800; 364/DIG. 1, 284.3, 260.1, 260.2

[56] References Cited

U.S. PATENT DOCUMENTS

| | | | |
|---|---|---|---|
| 4,594,476 | 6/1986 | Freeman | 179/6.08 |
| 4,882,729 | 11/1989 | Lobel et al. | 370/85.1 |
| 5,197,130 | 3/1993 | Chen et al. | 395/325 |
| 5,465,380 | 11/1995 | Hamanaka et al. | 395/800 |

*Primary Examiner*—Alvin E. Oberley
*Assistant Examiner*—Majid Banankhah

[57] ABSTRACT

A process for producing a parallel processor system having the minimum number of microprocessors necessary execute in real time a set of tasks of a multi-tasking application such that execution of an activity of a first task is followed by execution of an activity of a second task. The process includes the step of selecting an initial number of microprocessors for executing the application in real-time. The selecting step includes placing in a first column of a matrix all real-time constrained tasks specific to the application and associating a row of dependent tasks with each task placed in the first column of the matrix to define a plurality of task subsets, each subset incorporating a maximum number of intradependent tasks and a minimum number of interdependent tasks and the number of subsets corresponding to the initial number of microprocessors. The inventive process further includes the steps of listing dependencies between rows in a second column of the matrix, assigning a priority $p_i$ to each task where $p_i$ is between 0 and 1, subdividing at least one of the tasks into discrete activities, each of the activities having a corresponding execution time $t_{ij}$, estimating the execution time for each activity, reducing the number of rows in the matrix by grouping together tasks having activities that can be executed within a predetermined time window T, and providing a number of microprocessors corresponding to the number of rows obtained from the rows reducing step.

3 Claims, 2 Drawing Sheets

OPTIMAL PARALLEL PROCESSOR ARCHITECTURE FOR REAL TIME MULTITASKING

BACKGROUND OF THE INVENTION

1. Field of the Invention

This invention relates generally to multiprocessor computer architecture and, more particularly, to a parallel microprocessor system and method for progressively executing interactive multi-tasking programs.

2. Description of the Related Art

Real-time program execution has been the subject of exhaustive investigation, and a large body of literature exists on the subject. The following references, for example, are illustrative of recent efforts in the field: A. Burns & A. Wellings, "Real Time Systems and Their Programming Languages", Addison-Wesley, 1990; H. W. Lawson, "Parallel Processing in Industrial Real-Time Applications", Prentice Hall, 1992; and S. V. Kanalopoulos, "MicroComputers in Real Time Processing of Information", 23rd Midwestern Symposium in Circuits and Systems, Aug. 4–5, 1980.

In the context of program execution theory, the term "real time" means that at some point in time during the evolution of an event, some computational process on that event takes place without introducing any delay to the evolution of the event. Such a concept is, of course, most often purely theoretical in that no presently available electronic or mechanical computation system is fast enough to process very fast phenomena or events with zero delay. However, in practical systems, "very fast" and "slow" are relative terms that serve to indicate a level of speed in relation to the processing rate at which a given system operates. As such, a practical real-time system may be defined as one which can process a continuous flow of information without any loss of information. Accordingly, in any practical real-time application, one must first determine the minimum acceptable delay that can be introduced into the system. For this purpose, a small periodic time interval of predetermined duration, called a quantum time window, is defined that represents or sets the criterion for real-time processing.

Multi-tasking is a methodology whereby a program is partitioned into tasks or routines and each routine is further partitioned into small activities. As the program runs, it executes one activity at a time, while jumping from routine to routine, until all routines are executed. If execution is fast enough, it is possible to approach the ideal of parallel control. It should be noted, however, that multitasking only satisfies real-time requirements under certain circumstances and, even when it does, it does not necessarily yield the most cost-effective and optimum implementation.

In parallel processing, the sum of the tasks or programs to be accomplished is partitioned into a number of modules that may each consist of a plurality of tasks. Each module defined in this manner is coded and corresponds to a program that is loaded into a corresponding processor. Hence, a parallel processor architecture contains at least as many processors as the number of modules. A parallel architecture, in terms purely of speed, is more efficient than a single processor. However, in a parallel processor architecture, as the number of processors increases, the cost increases, the reliability decreases, and the added overhead of maintenance and inter-processor communication increases. As such, the efficiency of a parallel processor system decreases in an inverse manner with increasing numbers of available processors.

Accordingly, it is an object of the present invention to provide a parallel processor architecture which is capable of fast processing speeds but which utilizes the lowest possible number of processors.

It is a further object of the present invention to provide a parallel processor architecture which is economical to manufacture, yet which provides increased efficiency, improved reliability, and lower maintenance costs.

It is also an object of the present invention to provide an interactive processing system - - - that is, a system in which the processors work interactively and in unison to execute in real-time.

SUMMARY OF THE INVENTION

The aforementioned objects, as well as others which will become apparent hereinafter, are achieved by a parallel processing system for executing in real time an interactive multi-tasking program which includes a plurality of intradependent tasks and a plurality of interdependent tasks. The processor of the present invention comprises a system controller and a plurality of microprocessor units operatively associated with the controller. Each of the microprocessor units has a memory associated therewith and is operable to perform a subset of tasks, the subset containing a maximum number of intradependent tasks and a minimum number of interdependent tasks with at least one task of each subset having a real time constraint. Preferably, each microprocessor is provided with an on-chip memory.

The system further includes first means interconnecting the microprocessor units for communicating status and execution results therebetween and second means interconnecting the system controller and at least one of the microprocessor units for permitting communication therebetween. Each task comprises a plurality of individual activities with each activity having a priority of from 0 to 1 assigned thereto, and the system further includes vector means for identifying the priority of each activity, means for pointing to entry points of unexecuted activities, first flag means associated with dependent activities for indicating that a first activity has been executed while a second activity dependent thereon is still in progress, and timing means for measuring actual activity execution times.

The present invention also provides a process for producing a parallel processor system having the minimum number of microprocessors necessary to execute in real time a set of tasks of a multi-tasking application such that execution of an activity of a first task is followed by execution of an activity of a second task. The process includes the step of selecting an initial number of microprocessors for executing the application in real-time, such selecting step including placing in a first column of a matrix all real-time constrained tasks specific to the application and associating a row of dependent tasks with each task placed in the first column of the matrix to define a plurality of task subsets, each subset comprising a maximum number of intradependent tasks and a minimum number of interdependent tasks and corresponding to the initial number of microprocessors.

The process of the present invention further includes the steps of listing dependencies between rows in a second column of the matrix, assigning a priority $p_i$ to each task, where $p_i$ is between 0 and 1, subdividing at least one of the tasks into discrete activities, each of the activities having a corresponding execution time $t_{ij}$, estimating the execution time for each activity, reducing the number of rows in the matrix by grouping together tasks having activities which can be executed within a predetermined time window T, and providing a number of microprocessors corresponding to the number of rows obtained from the reducing step.

The various features of novelty which characterize the invention are pointed out with particularity in the claims annexed to and forming a part of the disclosure. For a better understanding of the invention, its operating advantages, and specific objects attained by its use, reference should be made to the drawings and descriptive matter in which there are illustrated and described preferred embodiments of the invention.

BRIEF DESCRIPTION OF THE DRAWINGS

The features and advantages of the present invention will be more readily understood from the following detailed description when read in conjunction with the accompanying drawings, in which.

DETAILED DESCRIPTION OF THE PREFERRED EMBODIMENTS

Figure 1:
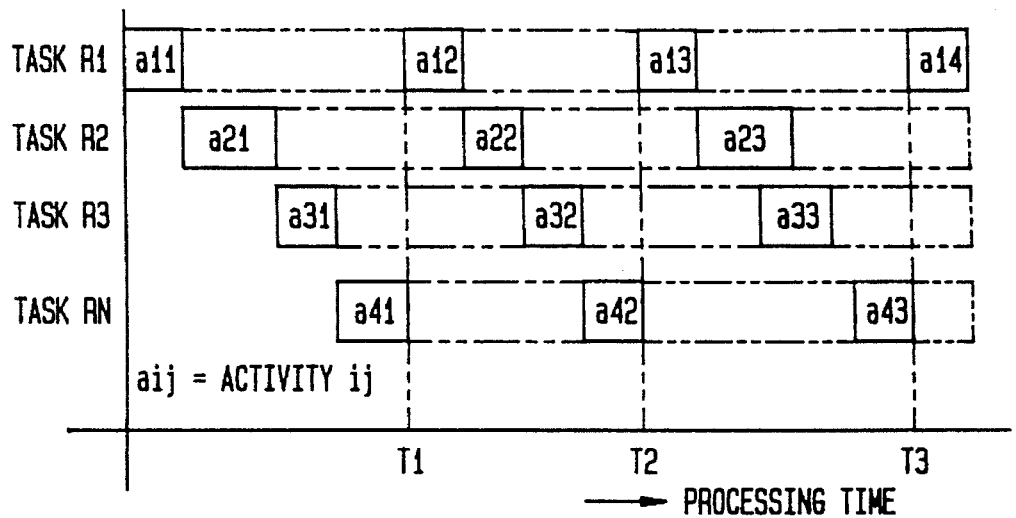
FIG. 1 is a chart depicting the principles of multitasking in which the execution of an activity of one task is followed by another activity of another task, with each group of activities being executed within a predetermined time window.

To facilitate a sufficient basis for an understanding of the processing system and method of the present invention, four real-time execution situations are briefly outlined and discussed in order of ascending complexity. The situations discussed herein include the single routine situation, the multiple routine situation, the multiple routine with priorities situation and the distributed multitasking situation.

Single Routine

Consider that the quantum time window is T, and that a program P has a single task or routine R. The task R is subdivided into mini-tasks or activities $a_j$. Then, the sum of all activities $a_j$ produces task R:

$$P = R = \sum_j a_j \tag{1}$$

If $t_j$ is the execution time for each activity, then the condition for real-time execution is:

$$T \geq \sum_j t_j \tag{2}$$

Multiple Tasks

Consider that a program P has many tasks or routines $R_i$. The tasks $R_i$ are subdivided into activities $a_{ij}$. Then, the sum of all activities $a_{ij}$ produces task $R_i$:

$$P = \sum_j^{n_i} R_i \tag{3}$$

where $n_i$ is the number of tasks in the program P, and, $$R_i = \sum_j a_{ij} \tag{4}$$

Next consider an occurrence factor $f_i$ that a task $R_i$, or its activity, will be invoked within the quantum time window T. At the two extremes, when $f_i=1$ the subroutine is invoked and is progressively executed; when $f_i=0$, then the task has either been invoked and completely executed or not yet invoked. Accordingly, the set of activities (A) executed at any point in time is:

$$A = \sum_i a_{ij} f_i \tag{5}$$

If $t_{ij}$ is the execution time for each activity, and if all activities are processed within time T, then the condition for real time execution is:

$$T \geq \sum_i t_{ij} f_i \tag{6}$$

It should be noted that the index j has a different value for each $a_{ij}$ or $t_{ij}$ in the preceding two equations (5) and (6), respectively.

Prioritized Multiple Tasks

Consider now that routines have different priorities and that a priority index $p_i$ is assigned to each routine. The priority index may be 1 (the highest priority) for some subroutines, fractions of 1 for intermediate levels of priority, or 0 to denote non-priority. As might be anticipated, routines with activities p=0 may be executed whenever time is available, activities with fractional priority may be executed over a number of quantum time windows, and activities with p=1 should be completely executed within the quantum time window. If a routine with a priority of 0 has started execution in one quantum time window, it may be interrupted by a top priority routine and resume in the subsequent quantum time window. Modifying equation (5) above to account for the newly introduced priority factor, the set of activities executed at any point in time is obtained from:

$$A = \sum_i (a_{ij}/p_i) p_i f_i \tag{7}$$

where $(a_{ij}/p_i)$ is an activity of $P_i$ with priority $p_i$. As such, the condition of real-time execution in this situation is defined by:

$$T \geq \sum_i t_{ij} p_i f_i \tag{8}$$

It will be noted that mini-tasks with $p_i=0$ do not contribute to the sum of equation (8) since their execution may be deferred until time is available. In addition, there are sometimes cases of dynamically changing priorities. By way of example, consider that under certain conditions (such as internal or external interrupts) the priority of an activity may increase from p=0 to p=1. In such a situation, any routines with dynamically changing priorities should be set to p=1 in equation (8) so as to accommodate the "worst case".

Distributed Multi-Tasking

In this final situation, n multi-tasking programs are assumed, each as described in the immediately-preceding "prioritized multiple tasks" section. As such, the total sum of activities per program at a given point in time is:

$$A_k = \sum_i (a_{ijk}/p_{ik}) p_{ik} f_{ik} \quad (9)$$

where k=1 to n, and $(a_{ij}/p_{ik})$ is an activity with priority $p_{ik}$. The condition for real time execution is therefore:

$$T = T_k \geq \sum_i t_{ijk} p_{ik} f_{ik} \quad (10)$$

for each $T_k$, and k=1 to n. Here it is assumed that all programs conform to the same quantum time window.

Interactive Real-time Multi-Tasking Methodology

In accordance with the method of the present invention, interactive real-time multi-tasking with distributed parallel processors is achieved in a cost effective manner by establishing the conditions under which the main problem statement can meet real-time requirements (i.e. by identifying the routines or tasks and their dependencies and partitioning the program for real-time calculation), by optimizing the problem statement in a cost effective high performance architecture, and by developing special data structures to ensure proper operation of the main program. Each of these steps will now be described in detail.

Identify Routines and Their Dependencies

Consider that a unit has to perform a set of tasks $R_i(T)$, where one or more of those tasks is subject to real-time constraints. The total set of tasks F is then expressed by:

$$F = \sum_i R_i(T) \quad (11)$$

This set is divided into a number of subsets $P_n$ such that each subset yields the maximum number of intradependent tasks and the minimum number of interdependent tasks. Dependent tasks are those that, at some point during their program execution, must utilize a parameter value supplied by another task. If the parameter value is not readily available at that point, execution is halted. Intradependent tasks are those that depend on other tasks of the same subset, whereas interdependent tasks are those that depend on tasks of other subsets. Accordingly, the total set F may also be expressed by the relationship:

$$F = \sum_n P_n \quad (12)$$

As will be discussed in more detail as this description proceeds, n is largely a function of the number of microprocessors utilized by the performance architecture. Dependencies between a subset $P_k$ and $P_1$ are expressed by:

$$D_{kl}(P_k P_l) \quad (13)$$

There is a close relationship between the aforementioned dependencies and those dependencies between the various routines R, the latter being expressed by:

$$D_{kl}(R_k R_l) \quad (14)$$

Program Partitioning For Real Time

The above described minimum-maximum methodology is specific to each application. In accordance with a simplified process, in accordance with the invention, all tasks $R_i$ are first identified. Then, the interdependencies $D_{kl}(R_k R_1)$ between tasks are identified. Tasks $R_i(T)$ with real-time constraints are identified and placed in the first column of a matrix. Rows of the matrix are then filled by placing the corresponding dependent tasks next to each respective first column routine, wherein each row corresponds to a $P_n$. Another column is formed in the matrix wherein the dependencies $D_{kl}(P_k P_1)$ are listed between the aforementioned rows. The balance of the matrix is filled in with the remaining non-dependent tasks. Priorities $p_i$, including dynamic priorities, are assigned to each routine or task of the matrix, and the tasks, especially those with real-time constraints or a priority value of p=1, are then subdivided into self-contained small activities $a_{ij}$. The real-time constrained tasks are coded according to a suitable programming language, and the execution time $t_{ij}$ for each activity $a_{ij}$ is then estimated.

At this point, it is necessary to verify that no task having a priority of p=1 has an estimated execution time $t_{ij}$ that exceeds the quantum time window T. For that purpose, it is helpful to utilize a graphical representation of the activities $a_{ij}$ for each row, as illustrated in FIG. 1. As there shown, within each time window T1, T2, T3 a plurality of activities are performed, each activity having an associated execution time illustrated in the chart and which is less than its corresponding time window. If any p=1 activity were to require an execution time that exceeds the quantum time window, it would be necessary either to break that activity down into even smaller individually-executable segments (such that at least one of the segments fits within the time window) or to rewrite the code to achieve a sufficiently rapid execution time. Equation (8), as set forth above, may also be utilized should it become necessary to reorder the activities.

In accordance with the present invention, the next objective is to optimize the program partitioning so that as many activities as possible may be executed within each quantum time window.

Programming Partitioning Optimization

Having established the conditions under which the main problem statement can satisfy real-time requirements, the number of rows in the resulting matrix indicates the number of microprocessors needed to accomplish the task. That is, each row constitutes the program or sum of activities to be executed by one microprocessor. Of course, the presence of the dependent rows implies that the microprocessors may communicate with one another to exchange results and other information. Hence, a communication protocol, as a further routine, should be incorporated into these dependent rows and the language of the protocol, including all messages thereof, should be defined. The speed and robustness of the protocol will determine the speed at which information will be exchanged between the microprocessors and, thus, how fast the dependent task will be executed. In this regard, it should be noted that any bottlenecks may affect the long-term operating performance of the system.

In any event, it should be readily appreciated by those skilled in that art that the solution thus far represented by the matrix of Table 1 may not be optimal. The next phase of the inventive methodology is therefore to optimize the problem statement itself in a cost effective, high performance architecture. Since the number of rows in the matrix corresponds to the number of microprocessors, any reduction in the number of rows will correspondingly reduce the number of processors required by the system architecture.

In accordance with the present invention, the number of rows and their dependencies are next are minimized to achieve an optimum system architecture which continues to satisfy real-time requirements. It is initially helpful to form a flow graph in which circles represent subsets $P_n$ that are variously interconnected with arrows to indicate the dependencies between them. Subsequently, the rows of the matrix are consolidated into larger modules. The activities of the larger modules are plotted with reference to Table 1, and this information is then used to estimate the execution time $t_{ij}$ for each activity (as indicated in the preceding section). Utilizing these execution time estimates $t_{ij}$, a comparison is made to verify that no $t_{ij}$ exceeds the quantum time window T.

The steps set forth in the preceding paragraph are repeated until there is obtained a minimum number of rows which still conforms to real time requirements. For each microprocessor, a main routine responsible for maintaining real time program execution flow is next developed. If it is determined that a certain ordering of tasks is required - - - that is, that execution of certain tasks should precede execution of others - - - the desired ordering sequence may be incorporated into the main routine.

Figure 2:
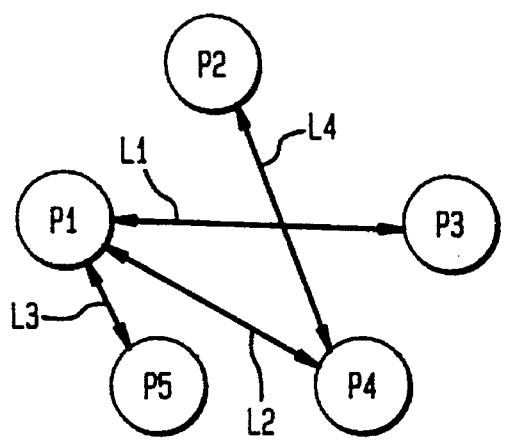
FIG. 2 is a flow dependency graph in which circles represent subsets $P_n$ interconnected with arrows indicating inter-dependencies to facilitate partitioning an illustrative program in accordance with the method of the present invention.
Figure 3:
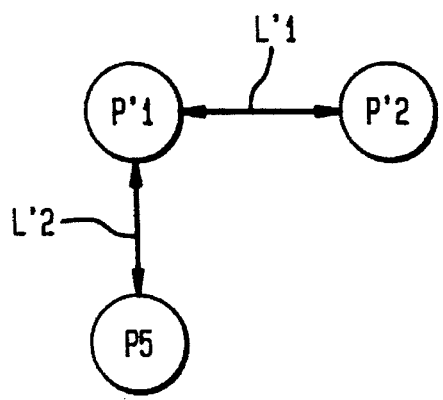
FIG. 3 is a flow dependency graph depicting a partitioned program corresponding to an optimized matrix obtained in accordance with the method of the present invention.

An enhanced understanding of the inventive optimization methodology discussed above may be further understood by reference to Table 1 and FIG. 2, which represent initial tabulations of tasks and dependencies for an illustrative example. Depicted in Table 1 are twelve tasks (abbreviated R1 to R12), three with real-time constraints (denoted by an *), and their dependencies on routines in other rows (indicated as $Rn_k$, denoting that $R_n$ depends upon $R_k$). It should be noted that this dependency notation does not indicate the dependencies of routines already in the same row, as this is the ultimate objective of the minimization process.

sents a final tabulation of tasks and dependencies, is shown in Table 2 and the interdependencies of rows is depicted in FIG. 3.

TABLE 2

| P'1: | $R1_3$ | $R2_4$ | R5 | R6 $R9_7$ | R10 | $R13_{17}$ | R14 | R15 | R16 | R18 | R20 | D(P'1,P'2),D(P'1,P5) |
|---|---|---|---|---|---|---|---|---|---|---|---|---|
| P'2: | $R3_1$ | $R4_2$ | $R7_9$ | R8 R11 | R12 | | | | | R18 | | D(P'2,P'1) |
| P5: | R13 | | | | | | | | | | R16 | D(P5,P'1) |

Routines within double lines are for inter-processor communications.

As seen in Table 2, the initial communications routine R15 has been eliminated since routine R14 performs the communications routine for the two reduced subsets P'1 and P'2. Similarly, routine R16 performs the communications protocol between the reduced subsets P'1 and the main controller P5. Thus, as seen in FIG. 3, only two communication links, L'1 and L'2, are needed. More importantly, a cost effective configuration requiring only two microprocessors and two communications protocols is achieved.

Data Structures

For the proper operation of the system, special data structures are developed. These include vectors that identify the priority of routines or activities, pointers to the entry points of activities waiting to be executed, and flags associated with dependent activities. Such flags are utilized to indicate when an activity has been completed and when another dependent activity, not necessarily in the same processor, is still in progress. Other data structures utilized are flags, associated with an activity, for indicating that a response should be generated and sent to another processor.

TABLE I

| P1: | $R1_3$* | $R5_6$ | $R9_7$ | $R13_{17}$ | $R15_{19}$ | R18 | R20 | D(P1,P3),D(P1,P4),D(P1,P5) |
|---|---|---|---|---|---|---|---|---|
| P2: | $R2_4$* | $R6_5$ | R10 | R14 | $R19_{15}$ | | | D(P2,P4) |
| P3: | $R3_1$* | $R7_9$ | $R11_{12}$ | | | R18 | | D(P3,P1) |
| P4: | $R4_2$ | R8 | $R12_{11}$ | | | R19 | | D(P4,P1),D(P4,P2) |
| P5: | $R17_{13}$ | | | | | | R20 | D(P5,P1) |

Routines within double lines are for inter-processor communications.

With reference to Table 1, it will be observed that tasks subject to real time constraints, R1 to R3 in this example are initially placed in different rows. The first four rows P1 to P4 include all tasks to be implemented by the processing unit and the fifth row P5 includes the routine R17 of the system controller, a reminder that an additional routine (R20) between the processing unit and the system controller should be developed for the communications protocol between the two. The tasks R14, R15, and R16 initially represent the communications (transport) protocol that is required. As best seen in FIG. 2, program P1 requires three communication links, L1, L2 and L3 and, as such, represents a rather complicated and ineffective arrangement. P2, dependent only on P4, requires a single link L4.

In accordance with the methodology of the present invention, in which real-time constraints, execution time(s) of activities, and microprocessors selected are all factors to be considered, the four rows depicted in Table 1 are reduced to two (P'1 and P'2), not counting the system controller which executes routine R13. The optimized matrix, which repre- Also provided are memory tables that contain messages and time-out values, and timers that are initialized with actual execution times and whose values are compared against the time-out tables.

Eventually, after a number of cycles of the main routine, all routines are executed progressively in real-time. As the main program runs, the processors become interactive - - - that is, they receive and transmit instructions and/or results from and to one another. The communications between the processors may include information that rearranges the order of routines in the main program, thereby altering the flow control and execution of functions, as necessary or appropriate.

Architecture and Implementation

The parallel processor architecture of the present invention may, by way of illustrative example, be implemented in a Time Domain Multiplex (TDM) voice communication system. In such a system, multiple incoming voice signals are each sampled at 8K samples/sec (i.e., twice the Nyquist sampling rate). Each voice sample is then pulse code modulated (PCM) in 8-bit binary, and pulse code modulated signals from 24 different voice signals (or channels) are time compressed and multiplexed. The 24 modulated samples in the serial bit stream are contained within a 125 μsec time window called a frame. The actual frame consists of 24 modulated samples at 64 Kb/sec each plus two 4 Kb/sec subrate channels; the first 4 Kb/sec subrate channel is generally used for network synchronization and the second for time slot control, system maintenance, and system testing. If data is substituted in place of pulse code modulated voice data, then the system transports either a mixture of PCM voice and data, or merely data.

In a voice communication system, it is the Nyquist criterion and the subrate channels which establish the quantum time window for real-time processing. As such, the particular implementing architecture, in conjunction with the program to be executed, must be capable of processing routines within 125 μsec in order to avoid bit reading errors or losses. Accordingly, the 125 μsec time interval may be treated as the real-time constraint T in configuring an optimum parallel processor architecture.

Figure 4:
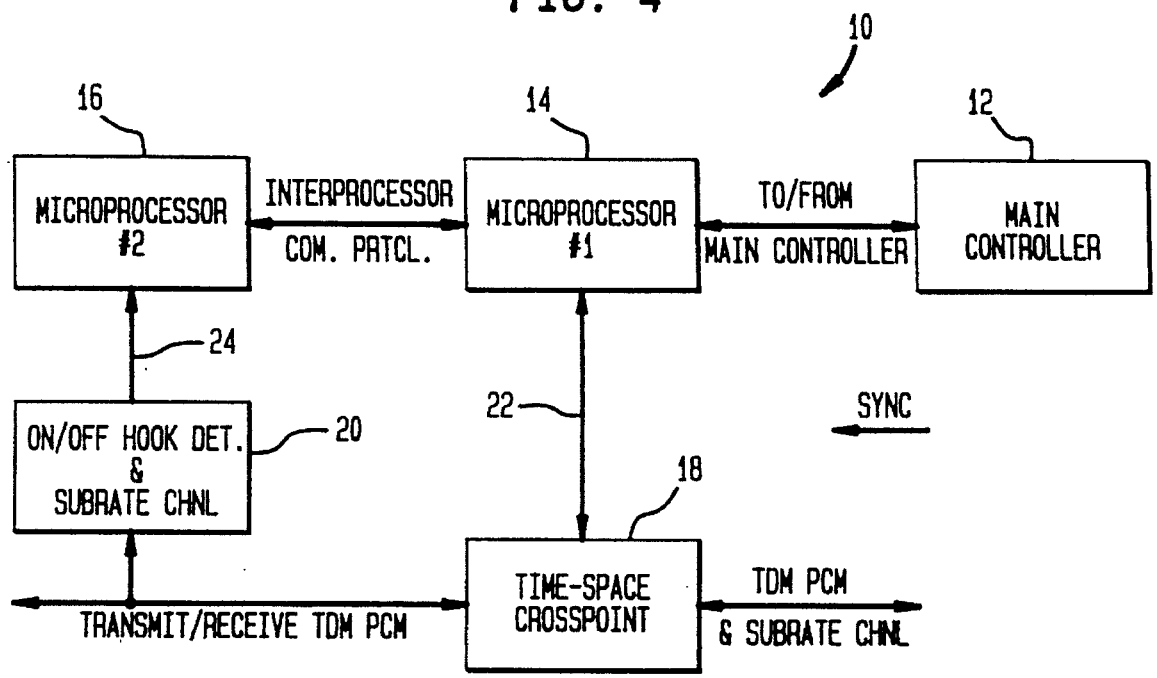
FIG. 4 is a block diagram of an illustrative example of a distributed interactive processor system constructed in accordance with the present invention.

In accordance with the method of the present invention, the functionality and specifications of the system and the various tasks and dependencies are first identified, yielding four modules. Based on the number of routines and their priorities, and proceeding in accordance with the methodology described above in connection with Tables 1 and 2 above, the most cost effective partitioning yield two modules. Thus, and as shown in FIG. 4, a distributed interactive processor unit 10 constructed in accordance with the present invention comprises a main controller 12, a first microprocessor 14, a second microprocessor 16, a time slot interchanger (TSI) 18, and an on/off hook detector/substrate channel module 20. The microprocessors work interactively, in parallel, and in synchronism with the TSI and the on/off hook state detection unit 20.

As will be readily apparent to those skilled in the art, the number of processors selected is by necessity a function of the problem statement and the real-time constraints thereof. Moreover, although the processor unit 10 of the illustrative embodiment is particularly configured for use in a voice communications system, it will be understood that the methodology herein described may readily be applied to any real-time problem.

Figure 5:
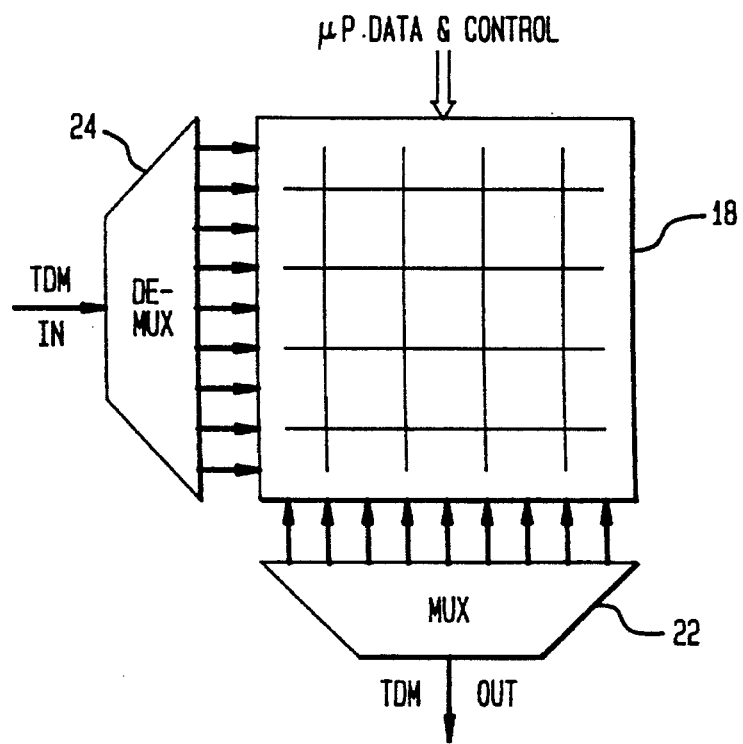
FIG. 5 is a block diagram depicting time-slot flow control utilizing the processor system of the present invention.

In any event, and as indicated above, the first subrate channel is used for network synchronization and the second is used for time slot control, system maintenance, and system testing. Accordingly, the system must be capable of reading and writing each bit of the subrate channels within the 125 μsec time window. Time-slot flow control is achieved by time slot interchanger 18. As more clearly shown in FIG. 5, coupled to the space-time crosspoint of TSI 18 is a multiplexer 22 that converts parallel channels into a sequential higher speed serial TDM bit stream. Also coupled to the time space crosspoint of TSI 18 is a demultiplexer 24 that converts the TDM bit stream back into parallel pulse code modulated channels. Processor system 10, based upon instructions from the subrate channel, controls the time-slot flow at the cross point - - - that is, it connects a time slot from any input to any output (space) in any time sequence (time). Additionally, the processor reads the contents of a specified time slot or inserts its own data into a specified time slot. To facilitate interprocessor communication, first microprocessor 14 and TSI 18 are interconnected, and second microprocessor 16 and on/off hook detect module 20 are interconnected, by a respective address data control bus indicated generally at 22, 24. The total bandwidth per direction through the TSI fabric is in excess of 16 Mb/s.

The illustrative parallel processor arrangement depicted in FIG. 4 utilizes high performance microprocessors 12, 14, and 16 to meet the real time requirements of a TDM communication system. The average execution time by a typical high performance microprocessor of a simple assembly instruction is 200 nsecs. As such, the partitioning of the tasks and dependencies must be such that the subroutines to be executed within each 125 μsec frame do not collectively exceed 625 machine instructions. Microprocessors 14 and 16 of the illustrative embodiment depicted in FIG. 4 preferably have on-chip memory (ROM and RAM) for temporary storage of data. Such a configuration avoids the higher costs and diminished performance associated with the use of external memory. One commercially available microprocessor of this type is the MC6805 series manufactured by Motorola, Inc. Since each MC6805 operates at a bus speed of 4 MHz, if an average instruction requires four cycles and the interprocessor communications protocol requires 2 Mb/sec, then approximately 2.5 million instructions per second can be executed by the microprocessors 14 and 16.

In implementing the FIG. 4 arrangement, a program for both microprocessors 14 and 16 was written in assembly language, based on the 6805C8 instruction set, with execution of the program being interrupted by a periodic external "interrupt" signal and by internal interrupts. In addition, conditional interrupts occur when certain conditions are met during execution of the program. If an interrupt occurs while another is being serviced, the program completes the one it is currently servicing and then deals with the subsequent one. Routines that handle the subrate channels are given top priority (p=1), while other subroutines have either more relaxed real-time constraints (p<1) or no priority at all (p=0). Dynamic priorities are assigned to the two communications subroutines. Although initially at p=0, the dynamic priorities change to p=1 each time a complete and correct character is received/transmitted from/to the other microprocessor. Conditional priorities are also assigned in that the software is adapted to interrupt execution of the program when internal conditions are met whereby the priority of the routine is changed from 0 to 1.

Although the shortest period between two bits of the 4 kb/sec subrate channel, 250 μsec, was determined to be the applicable time window, all top priority routines were partitioned into short activities in the manner described above such that the sum of their activities did not exceed 60% of the quantum time window to facilitate smooth execution of all routines and avoid bottlenecks. By thus minimizing the program code so that the execution time of top priority routines never exceeds 60% of the quantum time window, ample time is provided for program execution of low priority routines without added delays to dependent routines. The main program loop manages the execution of various routines in an orderly and timely fashion. If the main program is interrupted, it jumps to the appropriate routine, executes an activity, and then resumes execution of the main program at the point of departure.

Distributed interactive real-time multi-tasking with parallel processors in accordance with the present invention offers significant advantages over prior art approaches. For example, real-time requirements in TDM communication systems have typically been heretofore met by employing high speed application specific integrated circuits (ASICs). Unlike a microprocessor-based system, an ASIC system requires long development times, is often not particularly cost effective, and removes modification flexibility after chip design and fabrication.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. It is the intention, therefore, to be limited only as indicated by the scope of the claims appended hereto.

I claim:

1. A process for defining a parallel processor system having a minimum number of microprocessors necessary to execute in real time a set of tasks of a multi-tasking application such that execution of an activity of a first task is followed by execution of an activity of a second task, comprising the steps of:

(a) selecting an initial number of microprocessors for executing the application in real-time, said selecting step including:

placing in a first column of a matrix all real-time constrained tasks specific to said application; and associating a row of dependent tasks with each task placed in the first column of the matrix to define a plurality of task subsets, each task subset comprising a maximum number of intradependent tasks and a minimum number of interdependent tasks, and said plurality of task subsets corresponding to the initial number of microprocessors;

(b) listing dependencies between rows in a second column of the matrix;

(c) assigning a priority Pi to each task, where $p_i$ is between 0 and 1;

(d) subdividing at least one of the tasks into discrete activities, each of said activities having a corresponding execution time $t_{ij}$;

(e) estimating the execution time for each activity;

(f) reducing the number of rows in the matrix by grouping together tasks having activities which can be executed within a predetermined time window T; and (g) providing a final number of microprocessors corresponding to the number of rows obtained from said reducing step.

2. The process of claim 1, wherein all tasks with real-time restraints are subdivided during said subdividing step.

3. The process of claim 1, wherein all tasks with a priority of p=1 are subdivided during said subdividing step.

* * * * *